(12) United States Patent
Misawa et al.

(10) Patent No.: US 7,916,300 B2
(45) Date of Patent: Mar. 29, 2011

(54) SPECTROSCOPY DEVICE, SPECTROSCOPY APPARATUS AND SPECTROSCOPY METHOD

(75) Inventors: Takeshi Misawa, Miyagi (JP); Shuu Takahashi, Miyagi (JP); Mitsuru Iwata, Odawara (JP); Kazuya Oda, Miyagi (JP); Motoari Ota, Kanagawa-ken (JP); Kazuyoshi Ito, Suita (JP); Yasuyuki Ozeki, Suita (JP); Yoshitaka Kobayashi, Suita (JP)

(73) Assignee: Fujifilm Corporation, Tokyo (JP)

( * ) Notice: Subject to any disclaimer, the term of this patent is extended or adjusted under 35 U.S.C. 154(b) by 419 days.

(21) Appl. No.: 12/186,986

(22) Filed: Aug. 6, 2008

(65) Prior Publication Data

US 2009/0040520 A1  Feb. 12, 2009

(30) Foreign Application Priority Data

Aug. 7, 2007  (JP) ................................. 2007-205075
Aug. 1, 2008  (JP) ................................. 2008-200084

(51) Int. Cl.
*G01B 9/02* (2006.01)
*G01J 3/45* (2006.01)
*G01N 21/00* (2006.01)

(52) U.S. Cl. ........................................ 356/451; 359/894
(58) Field of Classification Search .................. 356/451, 356/454, 519, 450; 359/232, 247, 259, 891, 359/894

See application file for complete search history.

(56) References Cited

U.S. PATENT DOCUMENTS

| | | | | |
|---|---|---|---|---|
| 3,936,157 A | * | 2/1976 | Kapany | 359/591 |
| 4,483,916 A | * | 11/1984 | Thiers | 430/236 |
| 5,223,986 A | * | 6/1993 | Mayerjak et al. | 359/894 |
| 5,504,575 A | * | 4/1996 | Stafford | 356/330 |
| 5,729,011 A | * | 3/1998 | Sekiguchi | 250/226 |
| 6,016,185 A | * | 1/2000 | Cullman et al. | 355/52 |
| 6,044,196 A | * | 3/2000 | Winston et al. | 385/146 |
| 6,151,114 A | | 11/2000 | Russell | |
| 6,396,053 B1 | * | 5/2002 | Yokoi | 250/234 |
| 6,642,498 B2 | * | 11/2003 | Verdonk et al. | 250/208.2 |
| 6,657,730 B2 | * | 12/2003 | Pfau et al. | 356/477 |
| 6,765,617 B1 | * | 7/2004 | Tangen et al. | 348/340 |
| 6,868,231 B2 | * | 3/2005 | Irving et al. | 396/322 |

(Continued)

FOREIGN PATENT DOCUMENTS

EP  1 630 532 A1  3/2006

(Continued)

OTHER PUBLICATIONS

Extended European Search Report dated Oct. 8, 2010; in corresponding Application No. 08252640.1.

(Continued)

*Primary Examiner* — Gregory J Toatley
*Assistant Examiner* — Scott M Richey
(74) *Attorney, Agent, or Firm* — Birch, Stewart, Kolasch & Birch, LLP

(57) ABSTRACT

A spectroscopy device that separates input light into a plurality of wavelength ranges. A metal body has a hole or aperture which is open on the upper side. The hole or aperture is formed in a polygonal shape having at least a pair of opposite faces not parallel to each other in horizontal cross-section. Inner side faces of the hole or aperture are finished as mirror like reflection surfaces. Polarized input light inputted from the opening to the hole or aperture is reflected by the reflection surfaces and a standing wave is generated inside of the hole or aperture by self interference, whereby the input light is separated into a plurality of wavelength ranges.

15 Claims, 13 Drawing Sheets

U.S. PATENT DOCUMENTS

| | | | | |
|---|---|---|---|---|
| 6,919,981 | B2 * | 7/2005 | Clikeman et al. | 359/247 |
| 6,956,706 | B2 * | 10/2005 | Brandon | 359/894 |
| 7,177,496 | B1 * | 2/2007 | Polynkin et al. | 385/24 |
| 7,236,286 | B2 * | 6/2007 | Clikeman et al. | 359/247 |
| 7,345,764 | B2 * | 3/2008 | Bulovic et al. | 356/419 |
| 7,408,718 | B2 * | 8/2008 | Smith | 359/673 |
| 7,433,042 | B1 * | 10/2008 | Cavanaugh et al. | 356/419 |
| 7,502,123 | B2 * | 3/2009 | Schmidt et al. | 356/519 |
| 7,554,673 | B2 * | 6/2009 | Kiesel et al. | 356/519 |
| 7,695,680 | B2 * | 4/2010 | Unlu et al. | 422/82.05 |
| 7,701,590 | B2 * | 4/2010 | Kiesel et al. | 356/519 |
| 2002/0175286 | A1 * | 11/2002 | Murguia | 250/339.07 |
| 2005/0185416 | A1 * | 8/2005 | Lee et al. | 362/551 |
| 2007/0097249 | A1 * | 5/2007 | Korenaga | 348/335 |
| 2007/0153288 | A1 * | 7/2007 | Wang et al. | 356/454 |
| 2007/0223000 | A1 * | 9/2007 | Gahan et al. | 356/454 |

FOREIGN PATENT DOCUMENTS

| | | |
|---|---|---|
| JP | 8-193884 A | 7/1996 |

OTHER PUBLICATIONS

Paiam M. R. et al.: "Design of Phased—Array Wavelength Division Multiplexers Using Multimode Interference Couplers" Applied Optics, vol. 36, No. 21, Jul. 20, 1997, pp. 5097-5108, XP00069175, ISSN:0003-6935.

* cited by examiner

TOP VIEW

A-A' CROSS-SECTIONAL VIEW

B-B' CROSS-SECTIONAL VIEW

FIG. 3A APERTURE SHAPE VIEWED FROM INPUT FACE OR OUTPUT FACE OF METAL PLATE
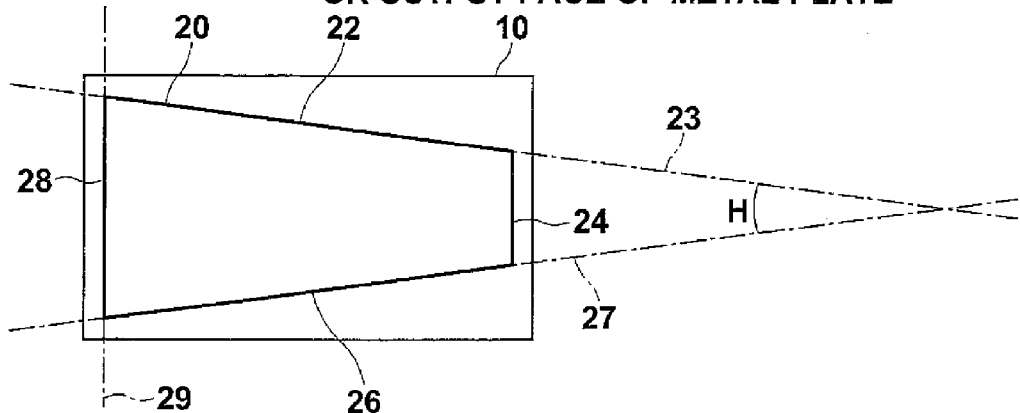
FIG. 3B DEFINITION OF APERTURE SHAPE
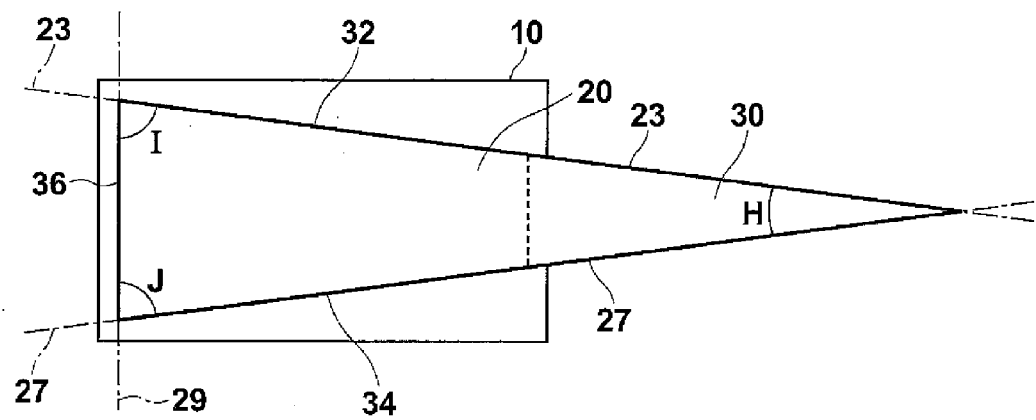
FIG. 4A
WAVELENGTH: 440nm
FIG. 4B
WAVELENGTH: 490nm
FIG. 4C
WAVELENGTH: 540nm
FIG. 4D
WAVELENGTH: 590nm
FIG. 4E
WAVELENGTH: 640nm
FIG. 4F
WAVELENGTH: 690nm

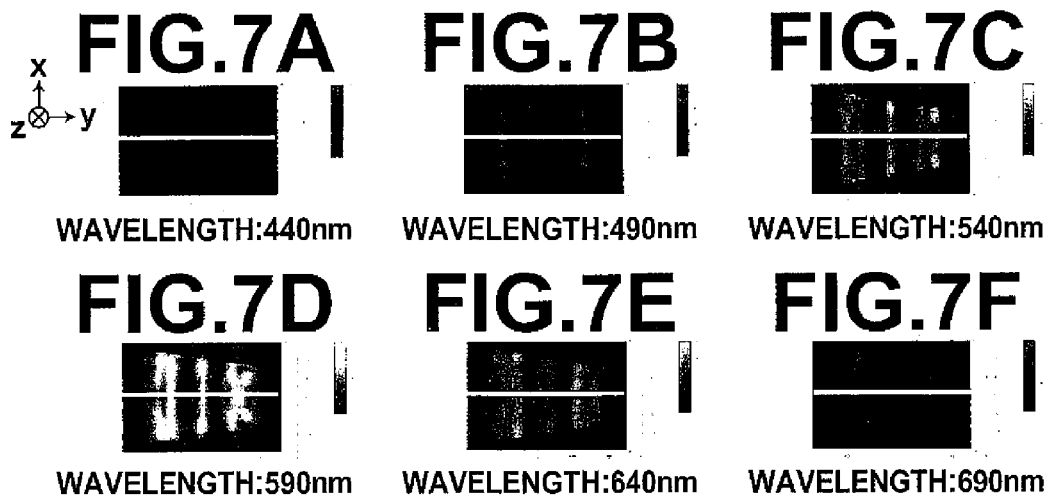
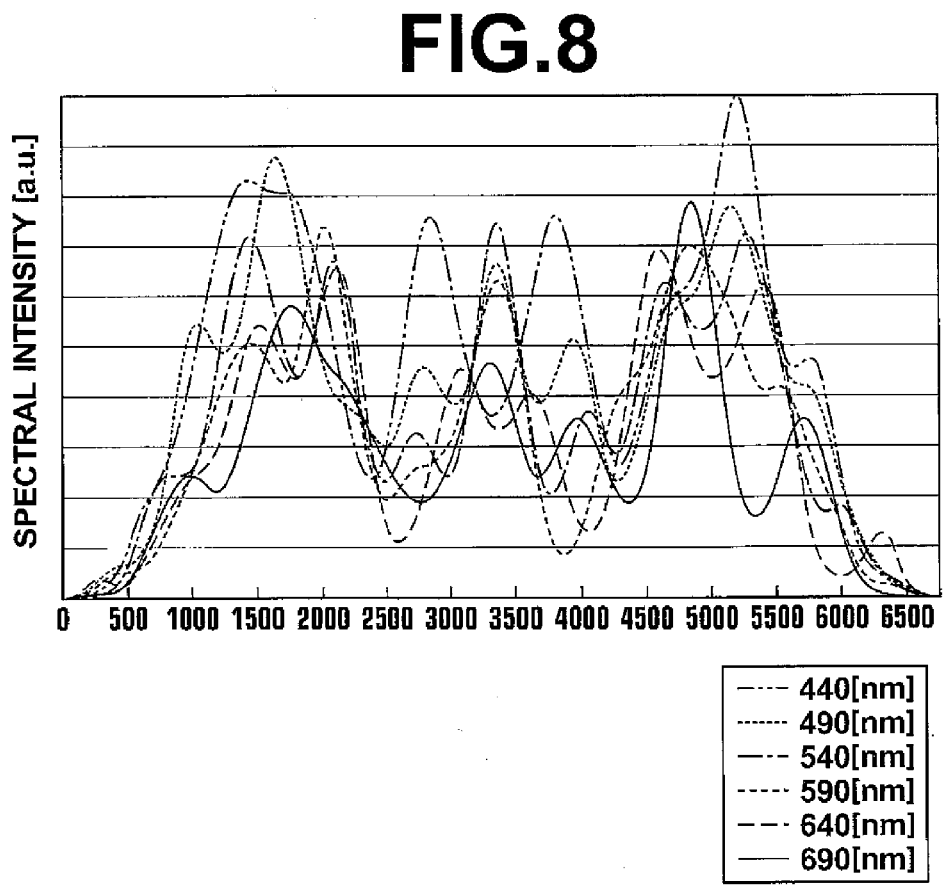

MODIFIED EXAMPLE 1 OF APERTURE SHAPE VIEWED FROM INPUT FACE OR OUTPUT FACE OF METAL PLATE

MODIFIED EXAMPLE 2 OF APERTURE SHAPE VIEWED FROM INPUT FACE OR OUTPUT FACE OF METAL PLATE

Ra=0.1μm , WAVELENGTH=380nm

Rb=0.5μm , WAVELENGTH=380nm

Ra=0.1μm , WAVELENGTH=480nm

Rb=0.5μm , WAVELENGTH=480nm

Ra=0.1μm , WAVELENGTH=580nm

Rb=0.5μm , WAVELENGTH=580nm

Ra=0.1μm , WAVELENGTH=680nm

Ra=0.5μm , WAVELENGTH=680nm

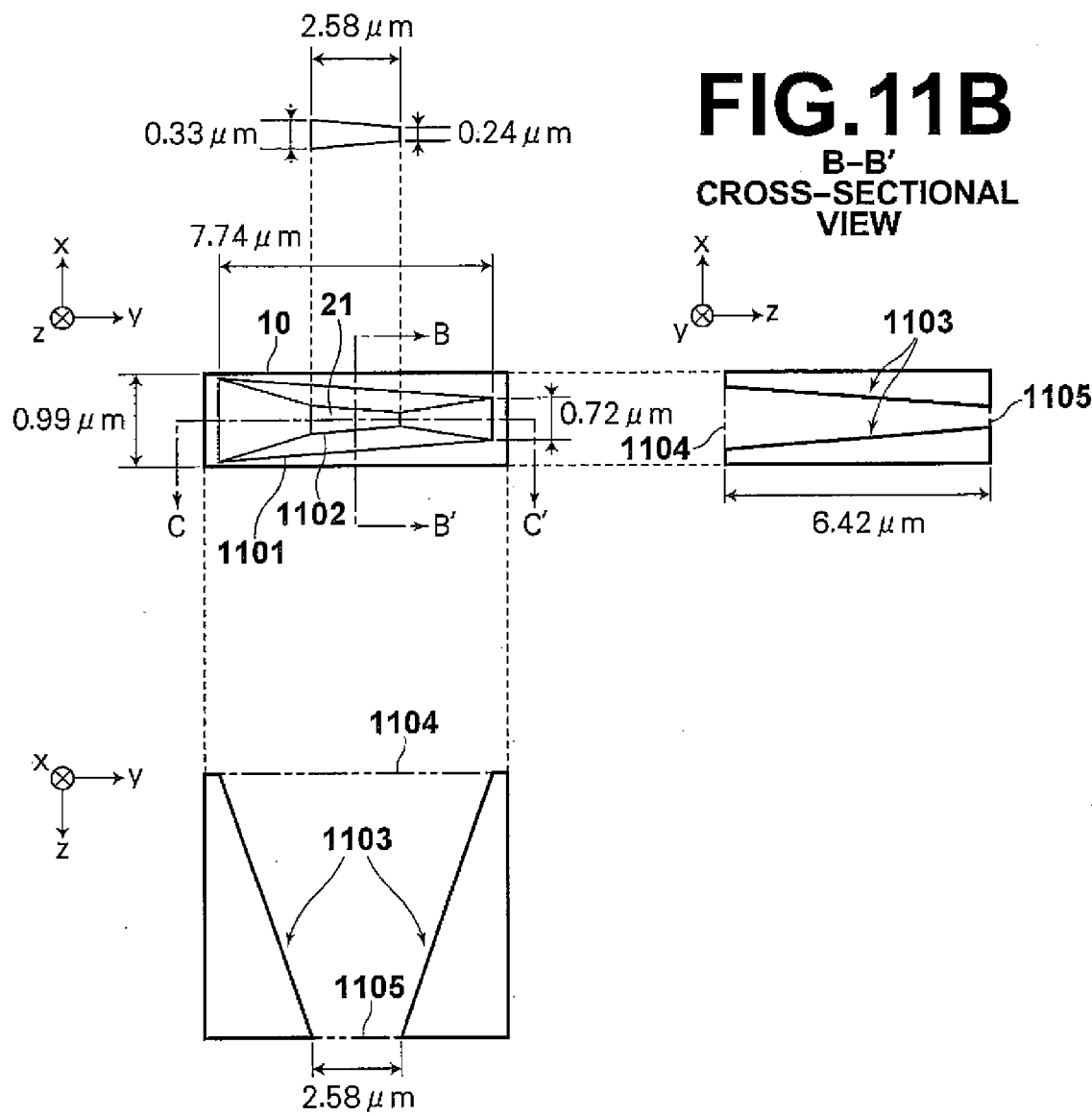

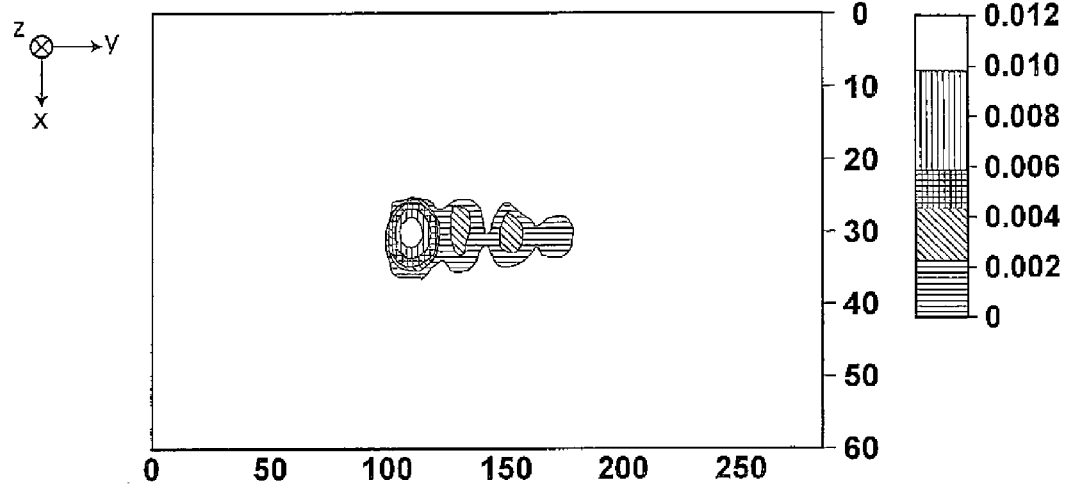
FIG.12A WAVELENGTH 440nm
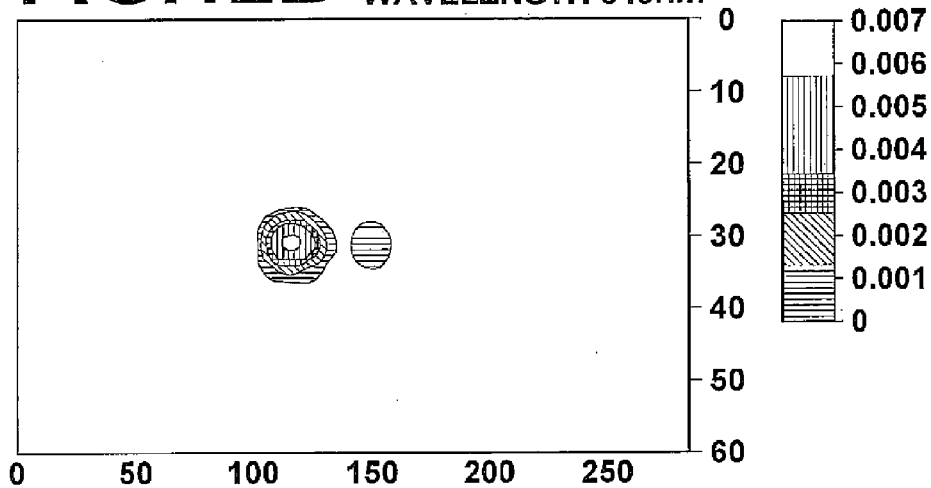
FIG.12B WAVELENGTH 540nm
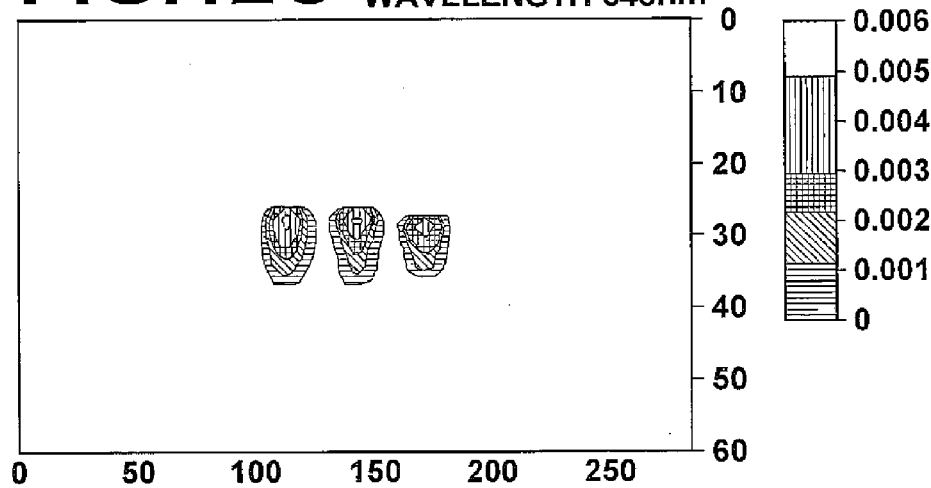
FIG.12C WAVELENGTH 640nm Z = 0    0.9    1.8    2.7    3.6    4.5    5.4    6.3μm
WAVELENGTH 390nm Z = 0    0.9    1.8    2.7    3.6    4.5    5.4    6.3μm
WAVELENGTH 490nm Z = 0    0.9    1.8    2.7    3.6    4.5    5.4    6.3μm
WAVELENGTH 590nm Z = 0    0.9    1.8    2.7    3.6    4.5    5.4    6.3μm
WAVELENGTH 690nm Z = 0    0.9    1.8    2.7    3.6    4.5    5.4    6.3μm
WAVELENGTH 790nm

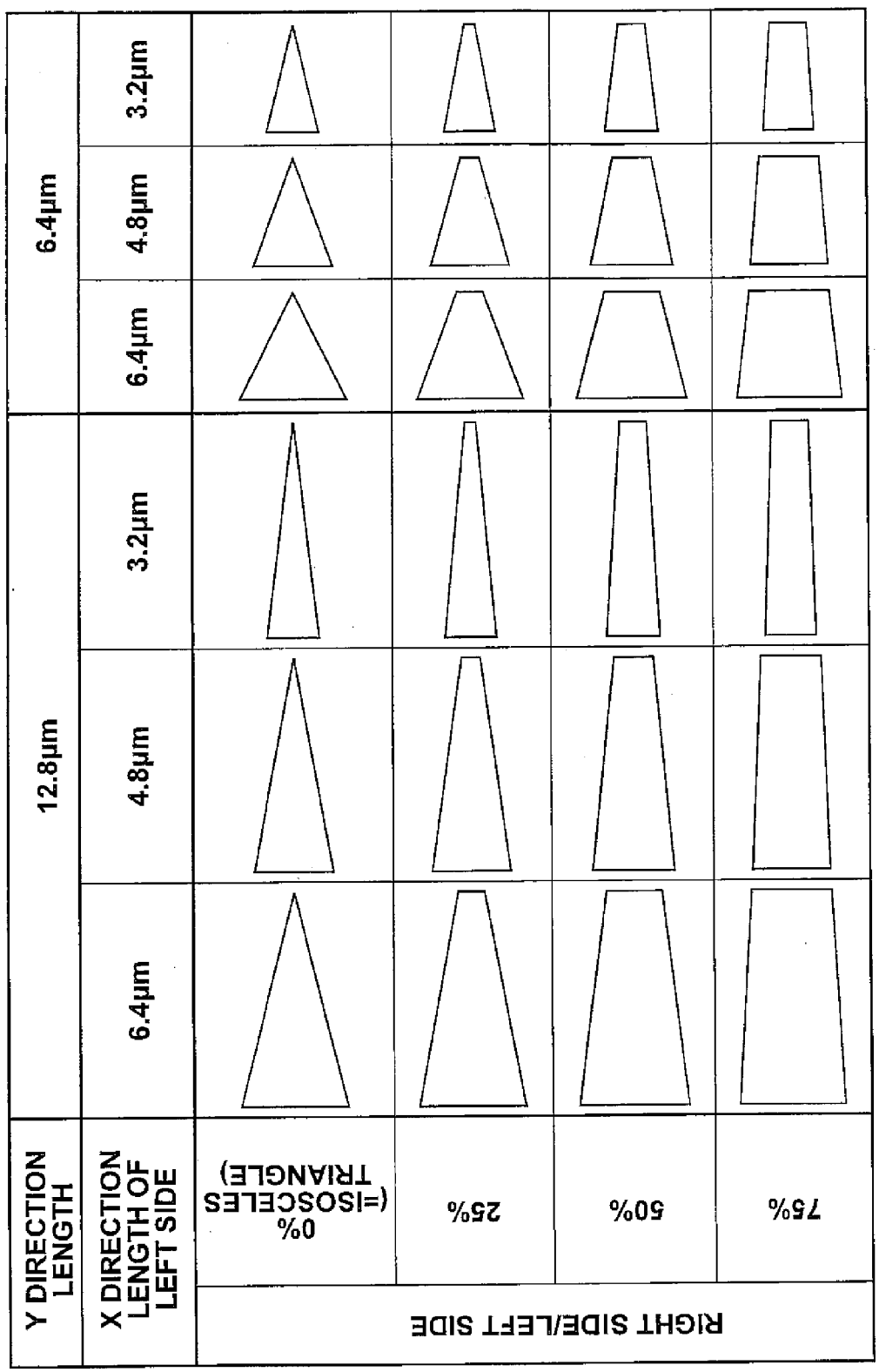

SPECTROSCOPY DEVICE, SPECTROSCOPY APPARATUS AND SPECTROSCOPY METHOD

BACKGROUND OF THE INVENTION

1. Field of the Invention

The present invention relates to a spectroscopy device for spectrally separating inputted light, and a spectroscopy apparatus and method using the same.

2. Description of the Related Art

As for spectroscopy devices, spectroscopy apparatuses, and spectroscopy methods, various structures are known. But, in general, they spectrally separate input light using a prism, and record the separated light beams after converting to electrical signals using an image sensor. Conventional spectrophotometers structured in the manner as described above have difficulty to detect a plurality of wavelengths at the same time, because a change in the wavelength to be separated corresponds to a mechanical change in the drive mechanism of the prism. Consequently, the following inventions have been made to solve this problem.

Japanese Unexamined Patent Publication No. 8 (1996)-193884 discloses a spectroscopy apparatus having the following disposed serially on the optical path in the order of: a first imaging lens, a slit plate, a first collimator lens, a spectroscopy means, a second collimator lens, a microprism array, a second imaging lens, and a two-dimensional array sensor. A light beam having a predetermined wavelength of those separated by the spectroscopy means is deflected by the microprism array and outputted in a predetermined direction. This causes a spectroscopic image to be formed on a predetermined sensor of the two-dimensional array sensor, whereby a spectroscopy apparatus capable of obtaining multitudes of spectra at the same time is realized.

U.S. Pat. No. 5,729,011 discloses a spectroscopy apparatus in which a field mask and a plurality of light refraction surfaces having normal lines in directions different from the directions of the optical axis of the optical system are formed, and a prism is disposed adjacent to the pupil surface of a lens such that the pupil surface of the lens is divided by each refraction surface, in addition to a lens and an image sensor. This causes a plurality of the same images generated on the image sensor to be formed as a plurality of the same spectroscopic images having a different wavelength component from each other, whereby a spectroscopy apparatus capable of obtaining spectroscopic images corresponding to a plurality of wavelengths at the same time is realized.

These spectroscopy apparatuses require an optical system including a prism and a lens for the image sensor imaging a spectroscopic image, so that a large space is required in terms of component arrangement or optical design. Consequently, the size of these spectroscopy apparatuses becomes very large. Further, components including the prism, lens, and image sensor are aligned over the housings, so that a prolonged time is required for the adjustment and the alignment accuracy is also limited.

It is an object of the present invention, therefore, to provide a novel spectroscopy device which is free from those problems found in the conventional spectroscopy devices, spectroscopy apparatuses, and spectroscopy methods.

SUMMARY OF THE INVENTION

The spectroscopy device according to the present invention is a device including a metal plate having a hole or aperture formed in a polygonal shape having at least a pair of opposite faces not parallel to each other in horizontal cross-section, the hole or aperture being open on the upper side wherein:

inner side faces of the hole or aperture are finished as mirror like reflection surfaces; and a standing wave is generated inside of the hole or aperture by interference caused by reflection of polarized input light inputted from the opening to the hole or aperture on the reflection surfaces, whereby the input light is separated into a plurality of wavelength ranges.

The terms "hole" and "aperture" as used herein mean a hole having a bottom and a through aperture respectively.

The hole or aperture has a size which may generate a standing wave inside thereof by reflecting light inputted therein, that is, a size not significantly greater than the wavelength of the light, for example, several times thereof.

The term "metal plate" generally means a thin metal having an upper face (front face) and a bottom face (rear face) which are parallel to each other, but it is not necessarily limited here to those having accurately parallel upper and bottom faces. Also, it is not limited to those having a thickness which is small in comparison with a size in horizontal directions.

The term "input light is separated into a plurality of wavelength ranges" as used herein means that light beams having different wavelength ranges are focused or stand on different positions inside of the hole or aperture and, if a sensor having light receiving elements corresponding to these positions is disposed, light beams having different wavelengths may be detected by the respective light receiving elements. As an example, spectral components having different wavelength ranges may be focused at horizontally different positions on the bottom of the hole or aperture.

The hole or aperture needs to have a polygonal shape in horizontal cross-section with at least a pair of opposite faces not parallel to each other, which is a condition for generating the standing wave described above and focusing different wavelength ranges at different positions. More specifically, for example, the shape may be a trapezoid, such as an isosceles trapezoid. The legs of a trapezoid form a pair of opposite faces not parallel to each other, so that it is thought that polarized light inputted from upper side of the hole or aperture, that is, from the opening described above repeats reflections between the opposite faces, whereby different wavelength ranges are focused at different positions adjacent to the bottom of the hole or aperture.

More specifically, the spectroscopy device of the present invention may be a device including a metal plate having a uniform thickness with an aperture running from the upper face to the bottom face, wherein:

when a cross-section of the aperture is taken parallel to the upper and bottom faces of the metal plate and three of the sides forming the cross-section are selected in descending order of length, extended lines of the three sides form an isosceles triangle having a narrow apex angle;

at least those of the inner side faces of the aperture contacting isosceles sides of the isosceles triangle are finished as mirror like reflection surfaces; and polarized input light inputted from the upper face of the metal plate to the aperture is separated into a plurality of wavelength ranges by interference caused by reflection of the input light on the reflection surfaces of the aperture.

Further, the spectroscopy device of the present invention may further include a polarizing element on the upper side thereof, and the polarization direction of the polarizing element is set to a direction parallel or orthogonal to the perpendicular bisector of the bottom side of the isosceles triangle.

The spectroscopy apparatus of the present invention may be an apparatus including any of the spectroscopy devices described above, and the aperture runs perpendicular to the upper and bottom faces of the metal plate.

Further, the spectroscopy apparatus of the present invention may be an apparatus including any of the spectroscopy devices described above and a light receiving element disposed at a position on the bottom face of the spectroscopy device corresponding to a localized position of spectral distribution of the input light, wherein the spectral distribution is converted to an electrical signal by the light receiving element.

Still further, the spectroscopy apparatus of the present invention may be an apparatus including a plurality of the light receiving elements disposed at positions corresponding to a plurality of localized positions of the spectral distribution.

Further, the spectroscopy apparatus of the present invention may be a two-dimensional spectroscopy apparatus including a plurality of the spectroscopy apparatuses disposed two-dimensionally, each being a combination of the spectroscopy device and one or more light receiving elements.

The spectroscopy method of the present invention is a method including the steps of:

providing a metal plate having a hole or aperture formed in a polygonal shape having at least a pair of opposite faces not parallel to each other in horizontal cross-section, the hole or aperture being open on the upper side with inner side faces thereof finished as mirror like reflection surfaces; and inputting polarized input light from the opening to the hole or aperture and generating a standing wave inside of the hole or aperture by interference caused by reflection of the input light on the reflection surfaces, whereby separating the input light into a plurality of wavelength ranges.

The spectroscopy device of the present includes a metal plate having a hole or aperture formed in a polygonal shape having at least a pair of opposite faces not parallel to each other in horizontal cross-section. The hole or aperture is open on the upper side with inner side faces thereof finished as mirror like reflection surfaces, and a standing wave is generated inside of the hole or aperture by interference caused by reflection of polarized input light inputted from the opening to the hole or aperture on the reflection surfaces, whereby the input light is separated into a plurality of wavelength ranges. Thus, the spectroscopy device of the present invention has a very simple structure, yet it may provide spectroscopic effects identical to those of conventional spectroscopy devices.

Further, the spectroscopy device and light receiving element may be manufactured by a semiconductor manufacturing process, so that a compact and high accurate spectroscopy apparatus may be realized.

Still further, an optical system including a prism and a lens is not required for the image sensor imaging a spectroscopic image, so that the space required in terms of component arrangement or optical design may be reduced. Consequently, the size of the spectroscopy apparatus may become very compact. Further, components including prism, lens, and image sensor are not used, so that it is not necessary to align them over housings. Consequently, time required for component adjustment is eliminated and at the same time alignment accuracy may be improved.

BRIEF DESCRIPTION OF THE DRAWINGS

FIGS. 3A, 3B define a shape of the aperture of the spectroscopy device of the present invention.

FIGS. 4A to 4F illustrate spectroscopic results of Y direction polarized input light with respect to each wavelength using the spectroscopy device of the present invention.

FIGS. 7A to 7F illustrate spectroscopic results of X direction polarized input light with respect to each wavelength using the spectroscopy device of the present invention.

FIG. 8 illustrates spectral intensity of X direction polarized input light using the spectroscopy device of the present invention (raw data).

FIGS. 11A, 11B, 11C illustrate a second embodiment of the spectroscopy device of the present invention.

FIGS. 12A, 12B, 12C illustrate spectroscopic results of Y direction polarized input light using the second embodiment of the spectroscopy device of the present invention.

FIG. 18 illustrates a sixth embodiment of the spectroscopy device of the present invention.

DESCRIPTION OF THE PREFERRED EMBODIMENTS

Hereinafter, exemplary embodiments of the spectroscopy device, spectroscopy apparatus, and spectroscopy method of the present invention will be described with reference to the accompanying drawings.

First Embodiment

Figure 1A:
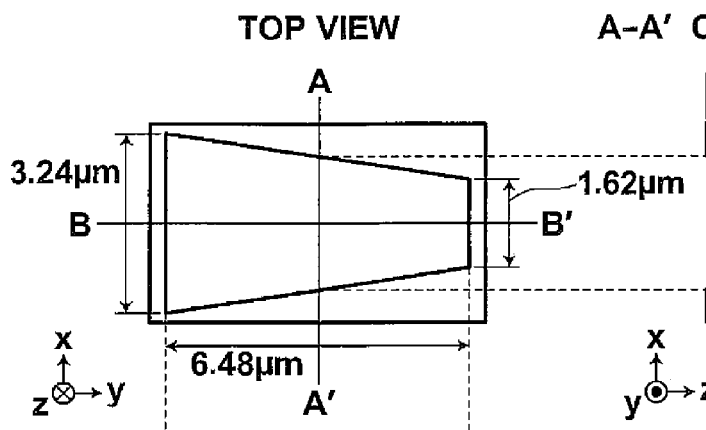
FIGS. 1A, 1B, 1C illustrate an example structure of the spectroscopy device of the present invention.
Figure 1B:
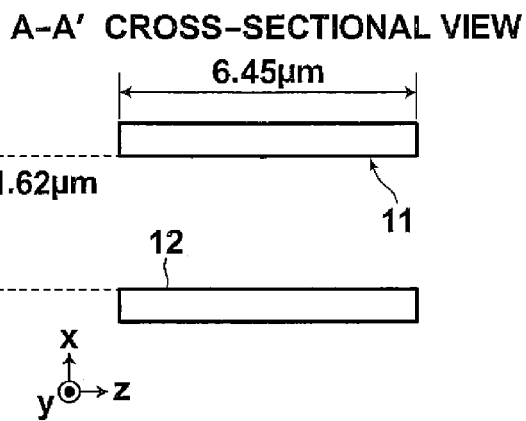
Figure 1C:
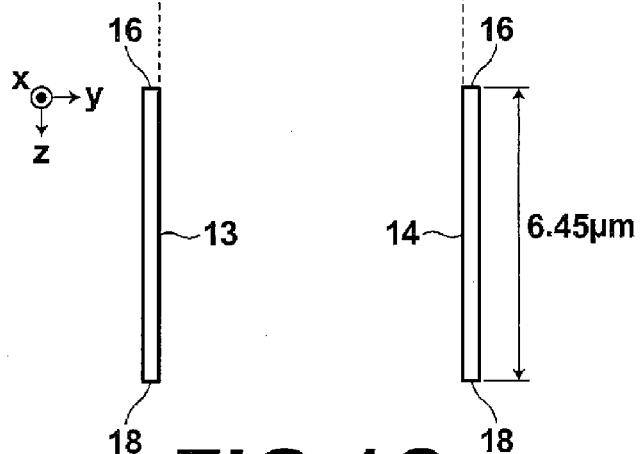

FIGS. 1A, 1B, 1C illustrate an example structure of the spectroscopy device 10 of the present invention. FIG. 1A is a top view of the spectroscopy device 10, illustrating the shape thereof viewed from the light input face. The spectroscopy device 10 is a structure made of a metal plate having a uniform thickness with an aperture 20 vertically running from the upper face, that is, input face to the bottom face, that is, output face. FIG. 1A depicts as if one spectroscopy device were independent from other spectroscopy devices, but it is preferable to have a structure in which the metal plate is shared by other adjacent spectroscopy devices from the standpoint of manufacture and use. Accordingly, the outer shape shown in FIG. 1A is an imaginary shape. FIG. 1B is a cross-sectional view taken along the line A-A' in FIG. 1A. The metal plate forming the structure of the spectroscopy device 10 reflects input light on the inner walls of the aperture 20. In the present embodiment, the reflection surfaces 11, 12 intersect perpendicularly with the input face 16 and output face 18. FIG. 1C is a cross-sectional view taken along the line B-B' in FIG. 1A. The reflection surfaces 13, 14 intersect perpendicularly with the input face 16 and output face 18 as in FIG. 1B.

Figure 2:
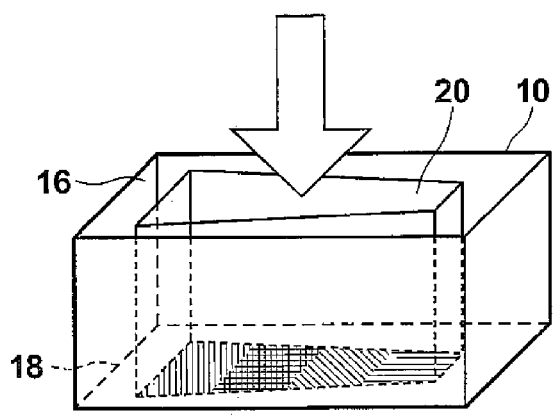
FIG. 2 is a conceptual diagram of the spectroscopy device of the present invention.

As illustrated in a conceptual diagram of the spectroscopy device of the present invention in FIG. 2, the spectral separation is achieved by a standing wave generated when input light from the input face 16 of the spectroscopy apparatus 10 and not shown reflection light of the input light reflected on the reflection surfaces reach the output face and interfere with each other. The standing wave at the output face 18 corresponds to the spectral intensity distribution.

FIGS. 3A, 3B define the shape of the aperture of the spectroscopy device of the present invention. The shape of the aperture 20 of the spectroscopy device of the present invention shown in FIG. 3A is defined in the following manner. Namely, the geometry enclosed by extended lines of three sides, side 22, side 26, and side 28 of those forming the aperture 20, that is, the geometry enclosed by the extended line 23, extended line 27, and extended line 29 forms an isosceles triangle 30 having a narrow apex angle H shown in FIG. 3B, that is, forms a triangle. The shape of the aperture 20 shown in FIG. 3A is a trapezoid which is formed by cutting an apex section of the isosceles triangle 30 parallel to the bottom side 28 thereof. This is dependent on the wavelength range of spectroscopic result to be obtained. If a short wavelength range of those of spectroscopic result to be obtained is not required, the apex section of the isosceles triangle may be omitted. Contrary, where a spectral separation is to be performed to a shorter wavelength range, the aperture becomes more like an isosceles triangle, and eventually becomes an isosceles triangle.

In the spectroscopy device of the present invention, input light is reflected by the reflection surfaces of inner walls, and spectral separation is achieved by a standing wave generated by the reflection light and input light. Thus, if an optical energy loss is great when input light is reflected by the reflection surfaces, the energy of the input light is lost when reflected by the inner walls of the structure of the spectroscopy apparatus, and it is difficult to obtain a clear intensity distribution at the output face. Therefore, it is necessary to select a material having a low reflection energy loss for the metal plate. For example, silver is known to be a metal having an excellent reflectance and may be used. In addition, gold, copper, and mirror materials such as gold, copper, an alloy of copper and tin, aluminum, and the like may be used. Technologies for accurately providing the aperture in these materials may include an anisotropic etching of semiconductor manufacturing technology, ultraprecision machining using pulse laser, fiber laser, or the like. Use of the semiconductor manufacturing technology allows high accurate spectroscopy devices to be stably produced.

Since only the inner walls of the aperture are required to be reflective, the aperture and other structures around thereof may be formed of a semiconductor substrate made of silicon which is the same material as that of a light receiving element, to be described later, or the like, and a thin film or a plate of gold, silver, copper, or an alloy of copper and tin may be used only for the inner walls. The aperture may be provided in the semiconductor substrate also by the semiconductor manufacturing technology. When forming a thin film of gold, silver, copper, or an alloy of copper and tin on the inner walls of the aperture provided in the semiconductor substrate, sputtering, vapor deposition, plating, or the like may be used. Where such structure is employed, an integral structure with light receiving elements which can be made of the same semiconductor substrate may be realized.

FIGS. 4A to 4F illustrate spectroscopic results of Y direction polarized input light using the spectroscopy device of the present invention. The coordinate system shown on the left of FIG. 4A corresponds to the coordinate system of the spectroscopy device shown in FIGS. 1A to 1C. It is a coordinate system with the vertical axis representing X direction of the spectroscopy device viewed from the top and the horizontal axis representing Y direction of the spectroscopy device viewed from the top indicating the manners in which input light, which is polarized in Y direction, is spectrally separated at each of six wavelengths from 440 nm (FIG. 4A) to 690 nm (FIG. 4F). In each of the graphs in FIGS. 4A to 4F, a more whitish portion represents a peak where the light having the wavelength is present strongly as standing wave. The peak position varies with the wavelength, showing that the spectroscopy device of the present embodiment functions as a spectroscopy device.

Figure 5:
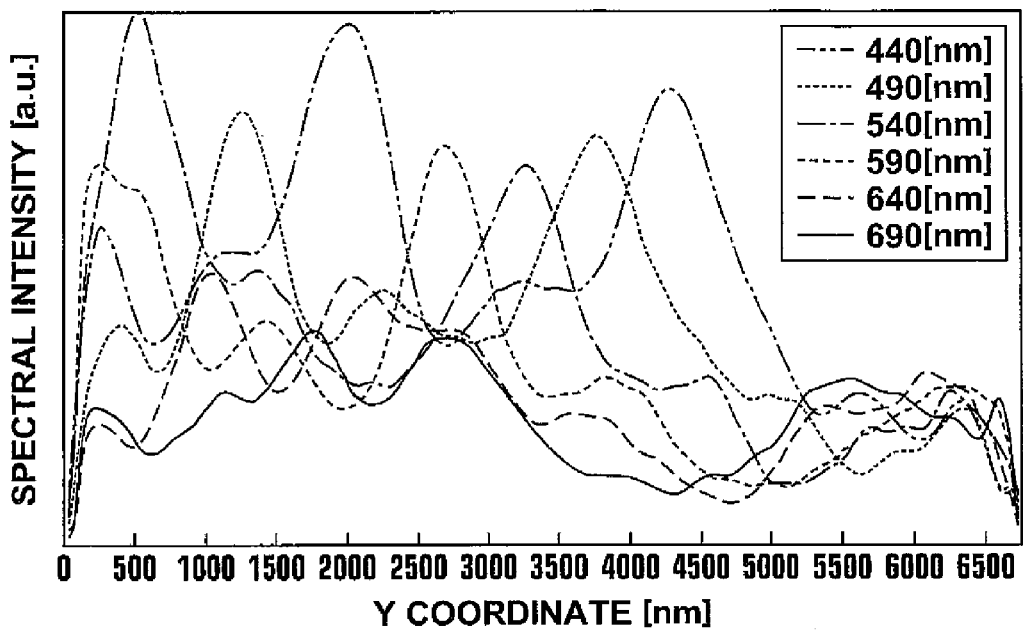
FIG. 5 illustrates spectral intensity of Y direction polarized input light using the spectroscopy device of the present invention.

FIG. 5 illustrates spectral intensity of Y direction polarized input light using the spectroscopy device shown in FIGS. 4A to 4F. In the graph shown in FIG. 5, the coordinate of Y direction (distance) is plotted on Y axis and spectral intensity is plotted on X axis on the central axis of X direction of the spectroscopy device. The Y coordinate is normalized by the maximum value of the spectral intensity, so that the graph shows relative values. The graph clearly shows the position where the standing wave presents strongly with respect to each wavelength, which is not clear in FIGS. 4A to 4F. For example, the 440 nm wavelength has its peaks at three positions on Y axis near 250, 2000, and 4200 nm. Looking at the Y coordinate from around 2500 to 4500 nm, it is known that a peak of the 590 nm wavelength is present near 2700 nm, and peaks of shorter wavelengths are present as the value of Y coordinate is increased.

Note that clear peaks of two wavelengths of 640 and 690 nm are not observed in the graph. As clear from FIGS. 4E and 4F, this is because the two wavelengths have their peaks at positions away from the central axis of X direction of the spectroscopy device.

Figure 6:
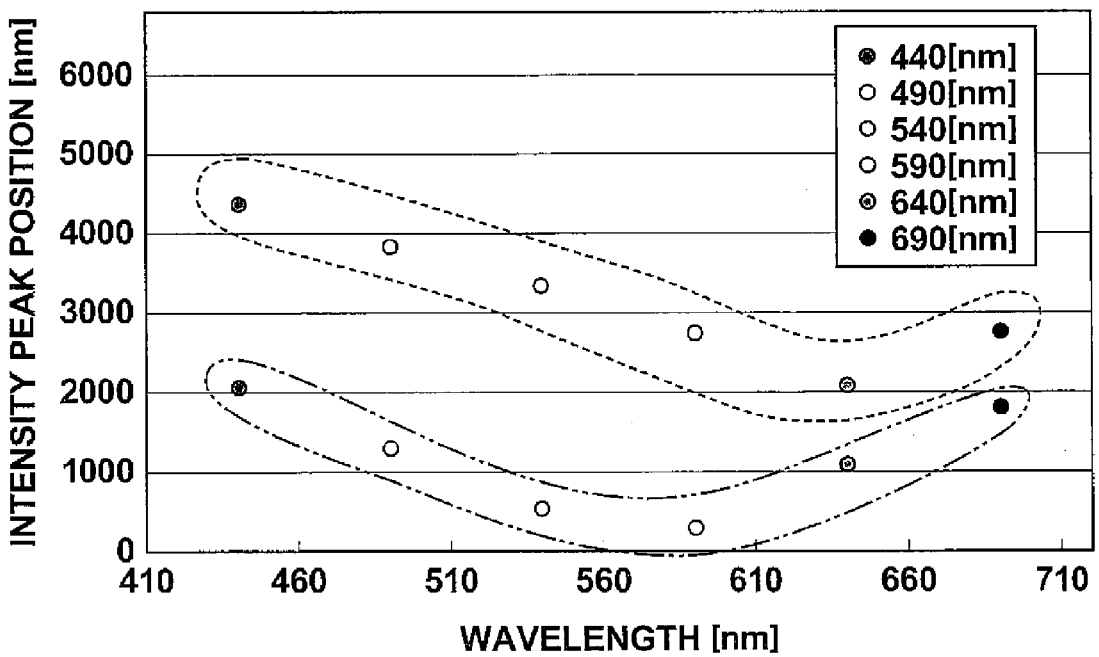
FIG. 6 illustrates wavelength dependence of peak position of spectral intensity of Y direction polarized input light using the spectroscopy device of the present invention.

FIG. 6 illustrates wavelength dependence of peak position of spectral intensity of Y direction polarized input light using the spectroscopy device of the present invention. X axis of the graph represents wavelength of input light and Y axis represents peak position of spectral intensity. The peak position 0 of the spectral intensity corresponds to the bottom side 28 of the spectroscopy device shown in FIG. 3A.

Peaks of spectral intensity of each wavelength may be largely classified into two groups. In a first group closer to 0 in the Y axis direction, the peak positions of the intensity move closer to 0 almost linearly as the wavelength becomes longer within the wavelength range from 440 to 540 nm. Contrary, the peak positions of the intensity move away from 0 almost linearly as the wavelength becomes longer within the wavelength range from 590 to 690 nm. In another group, that is, in a second group, the peak positions of the intensity move closer to 0 almost linearly as the wavelength becomes longer within the wavelength range from 440 to 640 nm. Contrary, the peak positions of the intensity move away from 0 almost linearly as the wavelength becomes longer within the wavelength range from 640 to 690 nm.

The reason that all the peak positions of intensity do not move closer to 0 almost linearly as the wavelength becomes longer is that input light is resonated in the aperture having a finite size. The reflection surface of the bottom side 28 has an effect on the resonance. If the bottom side 28 is located at an infinite distance, the peak positions of intensity move closer to 0 almost linearly as the wavelength becomes longer.

First Modification of First Embodiment

FIGS. 7A to 7F illustrate spectroscopic results of X direction polarized input light using the spectroscopy device of the present invention. The coordinate system shown on the left of FIG. 7A corresponds to the coordinate system of the spectroscopy device shown in FIG. 1A. FIGS. 7A to 7F illustrate the manners in which input light is spectrally separated at each of six wavelengths from 440 nm (FIG. 7A) to 690 nm (FIG. 7F). In each of the graphs in FIG. 7A to 7F, a more whitish portion represents a peak where the light having the wavelength is present strongly as standing wave. The peak position varies with the wavelength, showing that the spectroscopy device of the present embodiment functions as a spectroscopy device. Unlike the results of Y direction polarized light shown in FIGS. 4A to 4F, line like peaks parallel to X axis are observed.

FIG. 8 illustrates spectral intensity of X direction polarized input light using the spectroscopy device shown in FIGS. 4A to 4F. In the graph shown in FIG. 8, the coordinate of Y direction (distance) is plotted on Y axis and spectral intensity is plotted on X axis on the central axis of X direction of the spectroscopy device. The Y coordinate is normalized by the maximum value of the spectral intensity, so that the graph shows relative values. Positions where the standing wave is present strongly with respect to each wavelength which can be identified separately are in the vicinity of 2800 and 3800 nm of Y coordinate of 440 nm wavelength. If considering as a wavelength range, for example, from 490 to 590 nm, then a peak is thought to present in the vicinity of 3400 nm of Y coordinate, so that spectral separation may be achieved by the present spectroscopy device using these characteristics.

Second Modification of First Embodiment

Figure 9A:
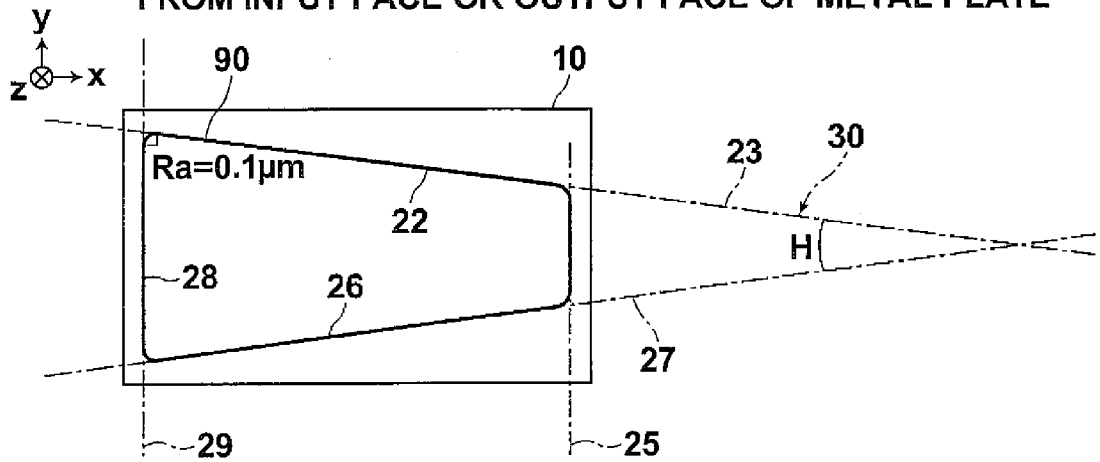
FIGS. 9A, 9B illustrate modified examples of the shape of the aperture of the spectroscopy device of the present invention.
Figure 9B:
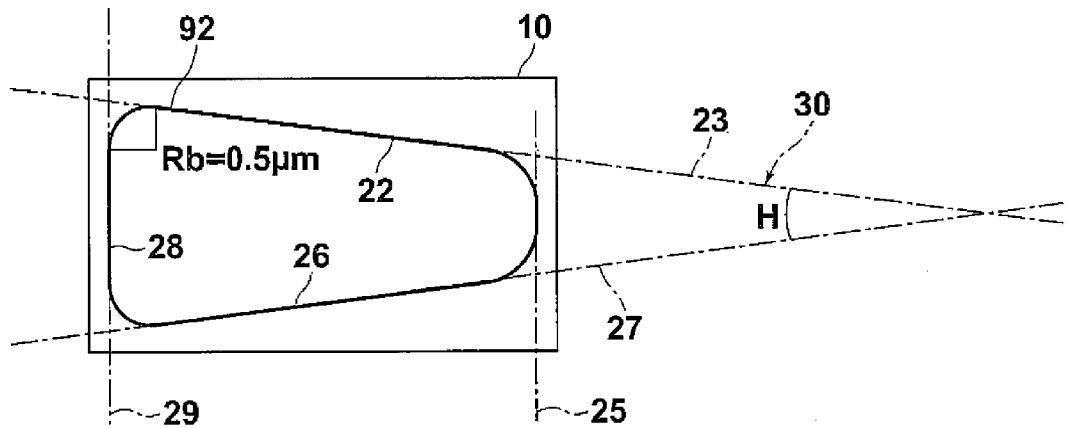

FIGS. 9A, 9B illustrate modified examples of the shape of the aperture of the spectroscopy device of the present invention. FIGS. 9A, 9B are basically identical, so that FIG. 9B will primarily be described here. The aperture 92 of spectroscopy device of the present embodiment is defined in the following manner. Namely, the geometry enclosed by extended lines of three sides, side 22, side 26, and side 28 of those forming the aperture 92, that is, the geometry enclosed by the extended line 23, extended line 27, and extended line 29 forms an isosceles triangle 30 with a narrow apex angle H, that is, forms a triangle. The shape of the aperture 92 shown in FIG. 9B is a trapezoid which is formed by cutting an apex section of the isosceles triangle 30 parallel to the bottom side 28 thereof. The aperture 92 differs from that of the first embodiment in that it has rounded corners.

In FIG. 9A, the corners are rounded with Ra=0.1 µm, and in FIG. 9B, the corners are rounded with Rb=0.5 µm. The shape of the aperture shown in FIG. 1 is an ideal shape, and if shaped like this, highest performance may be provided. Where practical machining accuracy is taken into account, however, a shape having rounded corners may be produced more inexpensively.

Figure 10A:
FIGS. 10A to 10H illustrate spectroscopic results of Y direction polarized input light using the spectroscopy device having the modified shape of the aperture.
Figure 10E:
Figure 10B:
Figure 10F:
Figure 10C:
Figure 10G:
Figure 10D:
Figure 10H:

FIGS. 10A to 10H illustrate spectroscopic results of Y direction polarized input light using the spectroscopy device according to the present embodiment. Although not shown, the coordinate system of FIGS. 10A to 10H is identical to the coordinate system of the spectroscopy apparatus shown in FIG. 9A. FIGS. 10A to 10H illustrate the manners in which input light is spectrally separated at each of four wavelengths spaced apart by 100 nm from 380 nm (FIGS. 10A and 10E) to 680 nm (FIGS. 10D and 10H). In each of the graphs 10A to 10H, a more whitish portion represents a peak where the light having the wavelength is present strongly as standing wave. The peak positions where the standing wave is present strongly and the distribution thereof are substantially identical between FIGS. 10A to 10D, which are spectroscopic results of the aperture rounded with the radius of 0.1 µm and FIGS. 10E to 10H, which are spectroscopic results of the aperture rounded with the radius of 0.5 µm, although details are different. This indicates that either of them functions as a spectroscopy device.

Second Embodiment

FIGS. 11A, 11B, 11C illustrate a second embodiment of the spectroscopy device 10 of the present invention. FIG. 11A is a top view thereof. The spectroscopy device 10 is a structure made of a metal plate having a uniform thickness with a tapered aperture 21 running from the upper face, that is, the input face to the bottom face, that is, output face. It differs from the spectroscopy device 10 according to the first embodiment shown in FIG. 1 in that the aperture 21 has a shape such that an input face shape 1101 of input light to the spectroscopy device 10 and an output face shape 1102 become analogous. Consequently, reflection surfaces connecting the input face shape 1101 and output face shape 1102 intersect therewith at an angle other than right angle.

FIG. 11B is a cross-sectional view taken along the line B-B' in FIG. 11A. The metal plate forming the structure of the spectroscopy device 10 reflects input light at inner walls of the aperture 21. In the present embodiment, the reflection surfaces 1103 intersect with the input face 1104 and output face 1105 at an angle other than right angle. FIG. 11C is a cross-sectional view taken along the line C-C' in FIG. 11A. The reflection surfaces 1103 intersect with the input face 1104 and output face 1105 at an angle other than right angle as in FIG. 11B.

FIGS. 12A to 12C illustrate spectroscopic results of Y direction polarized input light using the second embodiment of the spectroscopy device 10 of the present invention. The coordinate system shown on the left of FIG. 12A corresponds to the coordinate system of the spectroscopy device shown in FIGS. 11A to 11C. But, note that the positive direction of X axis is reversed (Here, Figures may be reversed upside down to align the directions). FIG. 11A illustrates spectroscopic results of 440 nm wavelength, FIG. 11B illustrates spectroscopic results of 540 nm wavelength, and FIG. 11C illustrates spectroscopic results of 640 nm wavelength. The light is visually observed in blue in FIG. 12A, green in FIG. 12B, and red in FIG. 12C. A comparison between FIGS. 12A and 12B shows that the peak position is moved from 106 nm to 110 nm in Y direction, although the difference is small. Further, a comparison between FIGS. 12B and 12C shows that the peak position is further moved to 112 nm, and also second and third peaks appear in the vicinity of 145 nm and 170 nm respectively. The results show that the spectroscopy device of the present embodiment functions as a spectroscopy device.

Third Embodiment

Figure 13:
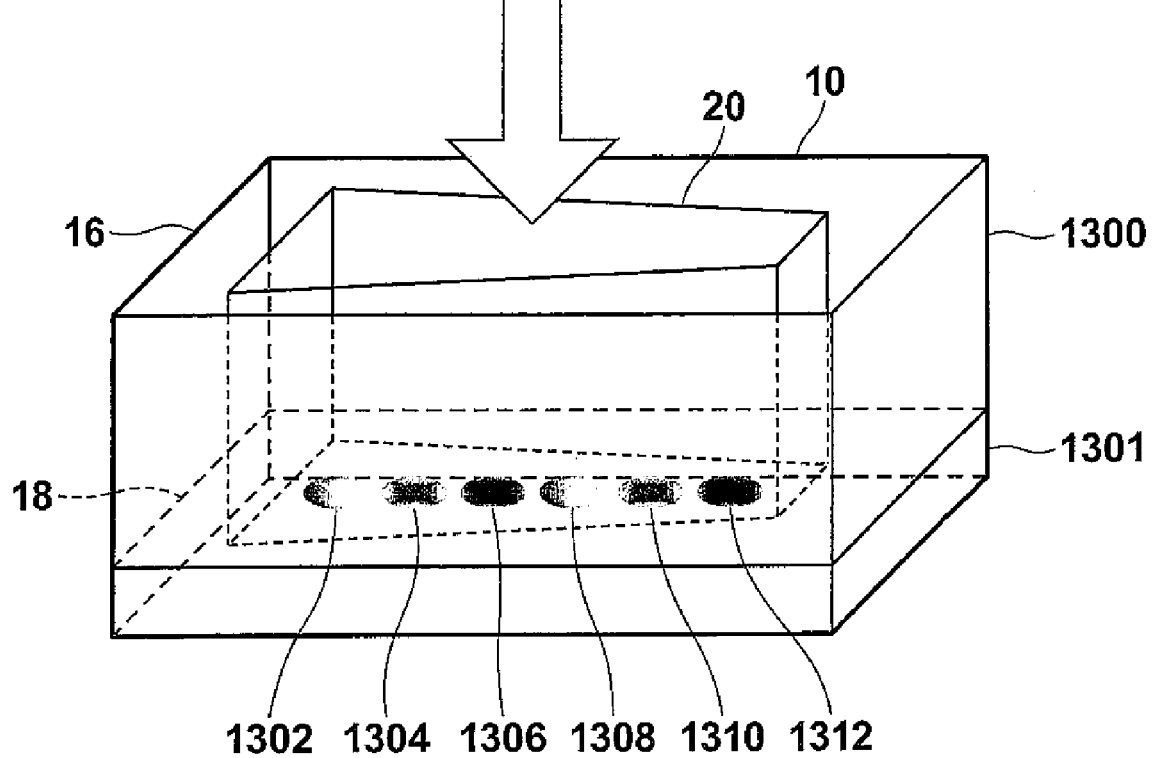
FIG. 13 illustrates an example spectroscopy apparatus constructed using the spectroscopy device of the present invention.

FIG. 13 illustrates an example spectroscopy apparatus 1300 constructed using a spectroscopy device 10 of the present invention. The spectroscopy device 10 may be either one of the spectroscopy devices described above. Input light to the spectroscopy device (white light, as an example) is spectrally separated by the aperture 20 and light receiving elements (1302 to 1312) are disposed at localized positions of the spectral distribution on the bottom face, thereby a spectroscopy apparatus capable of converting the spectral distribution to electrical signals is realized.

The light receiving elements (1302 to 1312) are formed on a semiconductor (e.g., silicon) substrate 1301. The light receiving elements may be those formed on a general semiconductor substrate using a common manufacturing method.

Since the wavelength received by each light receiving element is constant, if the individual light receiving elements (1302 to 1312) are capable of changing receiving sensitivity according to the wavelength, an efficient spectroscopy apparatus may be constructed by adjusting the receiving sensitivity of the individual light receiving elements to the respective receiving wavelengths. For example, the light receiving element 1302 receives a blue wavelength, thus the use of a light receiving element having spectroscopic characteristics with increased sensitivity for blue wavelength allows the spectroscopy apparatus 1300 to be an apparatus capable of reliably obtaining spectroscopic results even when the input light is weak.

Where individual light receiving elements (1302 to 1312) are structured to have the same spectroscopic characteristics, they may be produced by the same manufacturing process as that of conventional image sensors, which allows mass production of the light receiving elements, allowing the spectroscopy apparatus to be realized at low cost.

Figure 14:
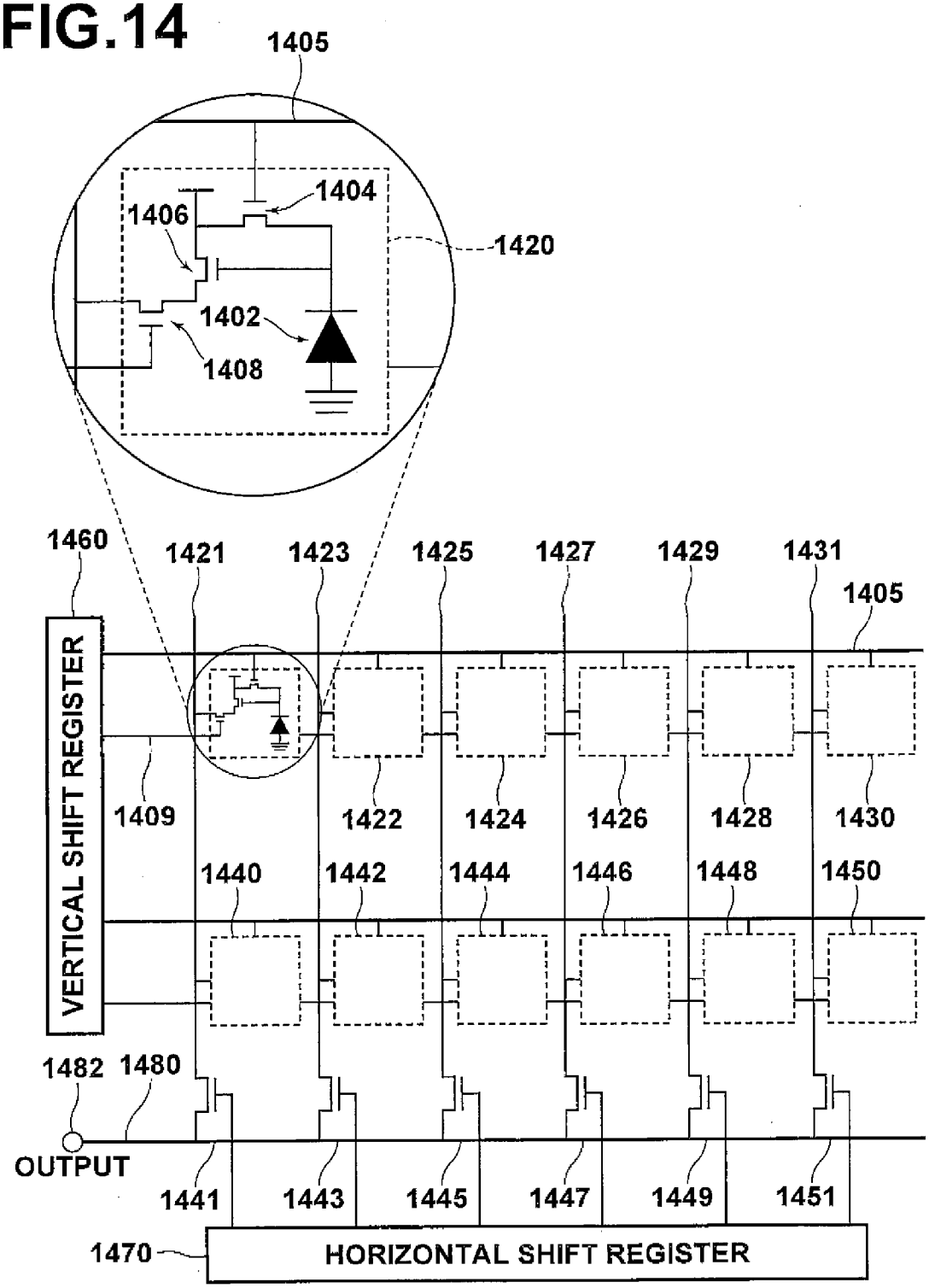
FIG. 14 illustrates a configuration of image sensor incorporated in the spectroscopy apparatus.

FIG. 14 illustrates a configuration of image sensor incorporated in the present spectroscopy apparatus. The image sensor shown in FIG. 14 is a CMOS image sensor, but a CCD image sensor, or other types of image sensors may be used other than the CMOS image sensor.

Each light receiving element 1410 includes: a photodiode 1402 for converting light to charges; a reset transistor 1404 for resetting charges stored in the photodiode 1402 according to a signal from a reset line 1405 prior to the start of exposure; an amplifier 1406 for amplifying signals from the photodiode 1402; and a readout transistor 1408 for reading out the amplified signals to a readout line 1421 according to a signal from a readout selection signal line 1409. The readout selection signal line of each row is connected to a vertical shift register 1460 and allows one row of signals to be outputted at the same time in the present embodiment. Each of the readout selection lines is selected by the vertical shift register 1460 as required.

Signals of received light received by individual light receiving elements are read out through readout lines 1421 to 1431. Horizontal selection transistors 1441 to 1451 are connected to each of the readout lines, and turned on to establish connection according to a signal from a horizontal shift register 1470, thereby the signal is outputted to an output line 1480 and eventually outputted from an output terminal 1482. It is appreciated that the configuration of the present invention is not limited to this, and configuration of these elements may be selected freely.

The light receiving elements 1302 to 1314 shown in FIG. 13 correspond to light receiving elements 1420 to 1430 or light receiving elements 1440 to 1450. The spectroscopy apparatus may be constructed by arranging light receiving elements according to required spectroscopic resolution. Where light receiving elements are disposed at a constant spacing, spectroscopic results of substantially equally spaced wavelengths, as clear from the spectral intensity of Y direction polarized input light using the spectroscopy device of the present invention. This is advantageous because existing image sensors and various types of photo-sensor arrays may be used.

The spectroscopy device and the light receiving elements are connected to each other by the following steps. First, light receiving elements are formed on a silicon substrate or the like by a semiconductor manufacturing process, and silica glass or the like is stacked to smooth the surface, if not smooth. Thereafter, a metal film is stacked on the smoothed surface of the light receiving elements by plasma CVD or vapor deposition, and finally an aperture is formed by etching or the like. Alternatively, silica glass is further stacked, then an aperture is formed, and a metal film is formed on the reflection surfaces of the aperture by vapor deposition, CVD, or electroless deposition. These steps may be implemented in a semiconductor manufacturing process, which provides advantageous effects that the spectroscopy device may be positioned accurately with respect to the light receiving elements.

Fourth Embodiment

Figure 15:
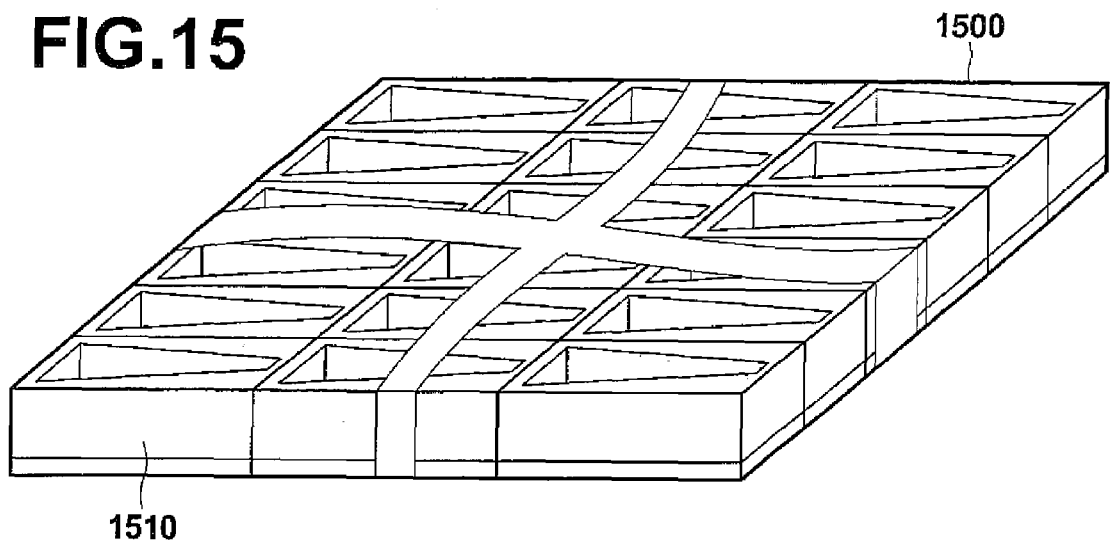
FIG. 15 illustrates a two-dimensional spectroscopy apparatus formed by disposing a plurality of the spectroscopy apparatus of the present invention two-dimensionally.

FIG. 15 illustrates a two-dimensional spectroscopy apparatus formed by disposing a plurality of the spectroscopy apparatus of the present invention two-dimensionally. That is, spectroscopy devices 1510 are serially disposed in XY directions to form a two-dimensional spectroscopy apparatus 1500. This allows spectral separation of a plurality of light sources or measurement of light source spectral distributions to be performed. As described above, the use of the semiconductor manufacturing process allows a plurality of spectroscopy devices to be produced highly accurately on the same spectroscopy apparatus, so that a high accurate two-dimensional spectral measurement apparatus may be realized. Signal outputs may be readout in the same manner as that of an ordinary image sensor, and the outputs may be integrated or separately outputted from each spectroscopy apparatus as required. Further, the two-dimensional spectroscopy apparatus may be used as an ordinary image sensor since spectroscopic results are obtained two-dimensionally. When used as an image sensor, a high sensitivity image sensor may be realized since spectral separation is achieved by standing wave and loss of input light is small.

Fifth Embodiment

Figure 16:
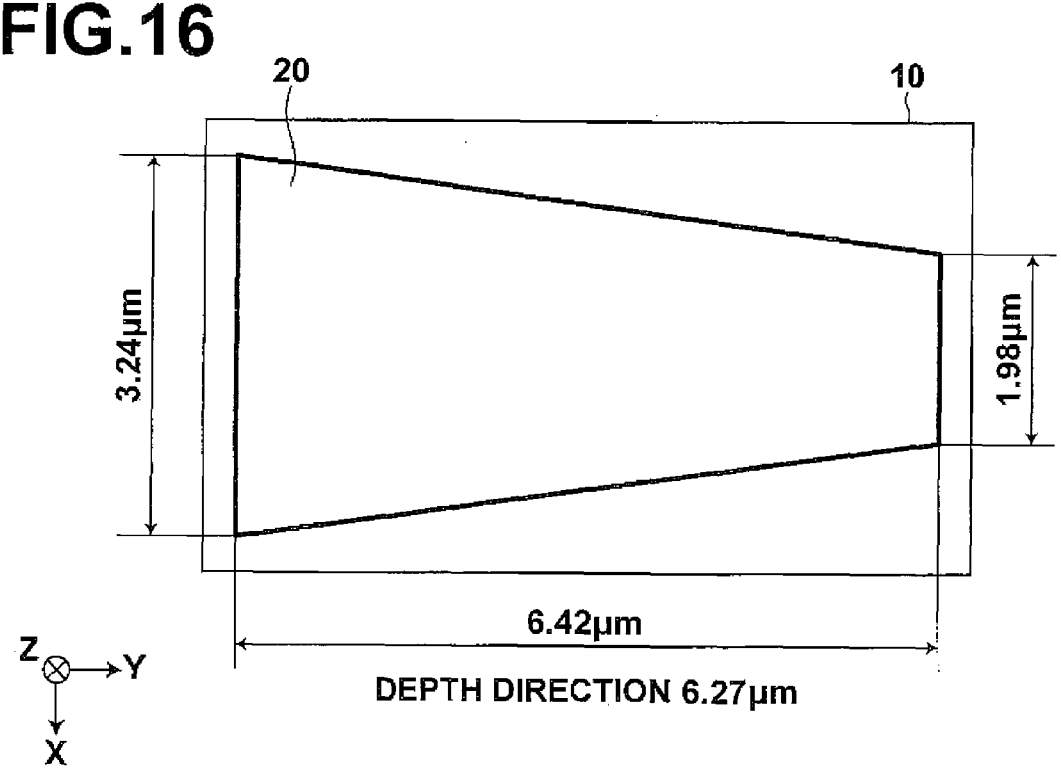
FIG. 16 illustrates a fifth embodiment of the spectroscopy device of the present invention.
Figure 17A:
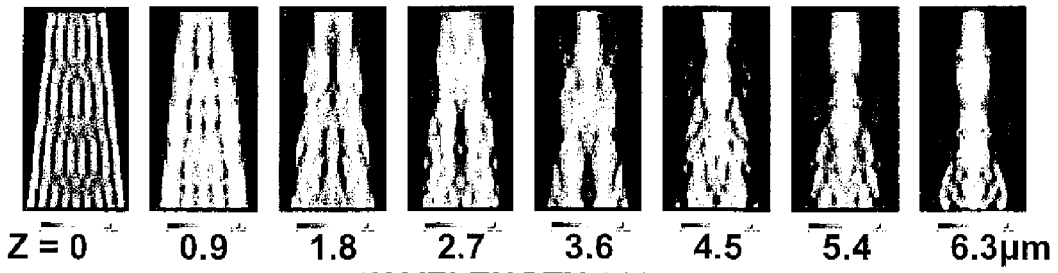
FIGS. 17A to 17E illustrate spectral intensity of Y direction polarized input light with respect to Z direction using the spectroscopy device of the present invention.
Figure 17B:
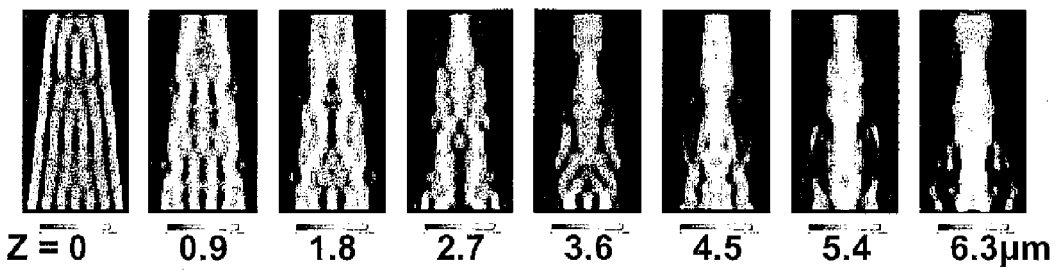
Figure 17C:
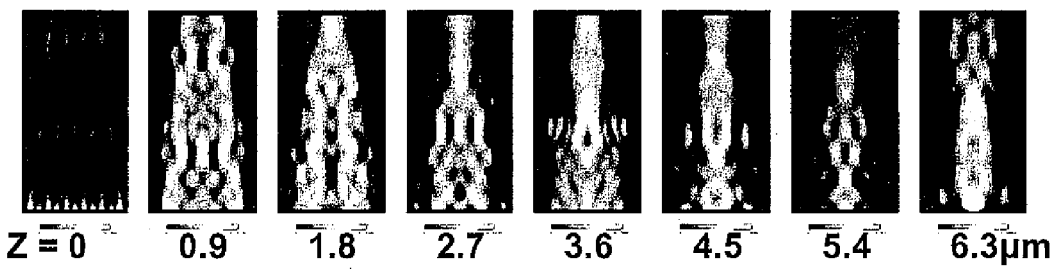
Figure 17D:
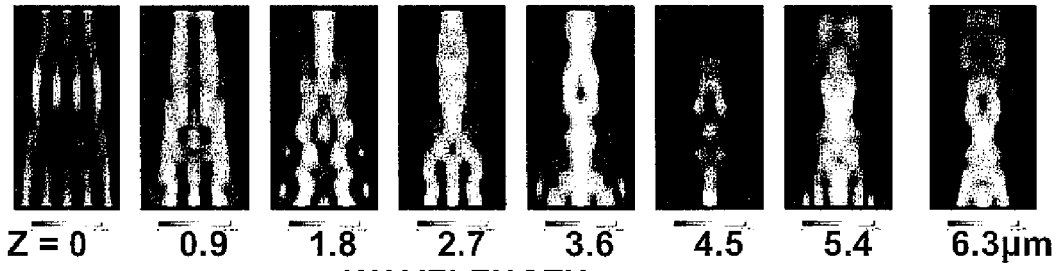
Figure 17E:
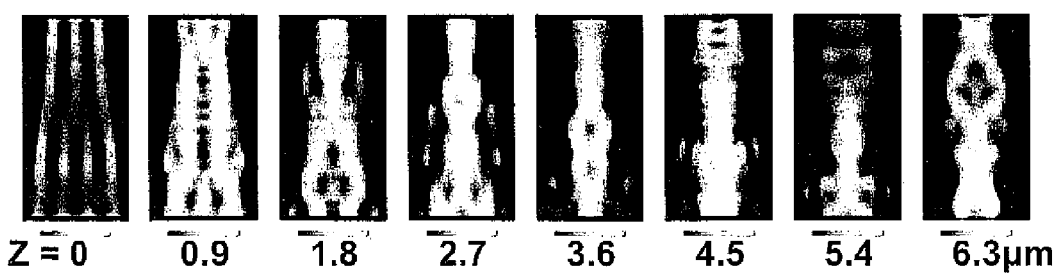

FIG. 16 illustrates another embodiment of the spectroscopy device 10 of the present invention. FIG. 16 is a top view of the aperture thereof. That is, the spectroscopy device 10 is a structure made of a metal plate having a uniform thickness with a trapezoidal aperture 20 vertically running from the upper face, that is, input face to the bottom face, that is, output face. The shape of the aperture 20 has a thickness of 6.27 μm in the depth direction (not shown). FIGS. 17A to 17E illustrate spectroscopic results of Y direction polarized input light using the spectroscopy device of the present embodiment. Note that the coordinate system in FIGS. 17A to 17E is rotated in comparison with the coordinate system in FIG. 16 for ease of arrangement of FIGS. 17A to 17E. FIGS. 17A to 17E illustrate the manners in which input light at each of five wavelengths spaced apart by 100 nm at 390 nm (FIG. 17A), 490 nm (FIG. 17B), 590 nm (FIG. 17C), 690 nm (FIG. 17D), and 790 nm is spectrally separated at eight cross-sections in the depth direction Z, from Z=0 to Z=6.3 μm. In each of the graphs 17A to 17E, a more whitish portion represents a peak where the light having the wavelength is present strongly as standing wave.

As clear from FIGS. 17A to 17E, the peak position where the standing waves present strongly and the distribution thereof appears at a position closer to the center as the depth in the Z direction is increased. At Z=0 μm, a standing wave parallel to the sides of Y direction (oblique sides of the trapezoid) of the aperture 20 appears, but a position where it appears strongly is not present. Comparison of FIGS. 17A to 17E shows that the standing wave has a tendency to reduce the wave number (stripes in Figures) as the wavelength becomes long. At the wavelength of 790 nm shown in FIG. 17E, a strong peak appears in the center at a depth greater than or equal to Z=2.7 μm. Strong peaks appear in the center for the wavelength of 690 nm shown in FIG. 17D at a depth greater than or equal to Z=3.6 μm, for the wavelength of 590 nm and 490 nm shown in FIGS. 17C and 17B, at a depth greater than or equal to Z=4.5 μm, and for the wavelength of 390 nm shown in FIG. 17A, at a depth greater than or equal to Z=5.4 μm. This shows that a depth greater than or equal to Z=5.4 μm is adequate when spectral separation is desired to be obtained at the center for all of the wavelengths shown in FIGS. 17A to 17E.

Sixth Embodiment

FIG. 18 illustrates variations of the shape of the aperture of the spectroscopy device of the present invention in a tabular form. In the FIG. 18, the aperture shapes are largely divided into left and right groups having Y direction lengths of 12.8 μm and 6.4 μm respectively. Each group is further divided into three groups having X direction lengths of left sides of 6.4, 4.8, and 3.2 μm respectively. With respect to each of the six different shapes, the ratio of the right side to the left side is changed from 0% (i.e., isosceles triangle) to 75% with an increment of 25% to produce the aperture samples. It has been demonstrated that these aperture shapes function as spectroscopy devices.

What is claimed is:

1. A spectroscopy device comprising a metal plate having a hole or aperture formed in a polygonal shape having at least a pair of opposite faces not parallel to each other in horizontal cross-section, the hole or aperture being open on the upper side wherein:
   inner side faces of the hole or aperture are finished as mirror like reflection surfaces; and
   a standing wave is generated inside of the hole or aperture by interference caused by reflection of polarized input light inputted from the opening to the hole or aperture on the reflection surfaces, whereby the input light is separated into a plurality of wavelength ranges.

2. The spectroscopy device according to claim 1, wherein spectral components having different wavelength ranges are focused at horizontally different positions on the bottom of the hole or aperture.

3. The spectroscopy device according to claim 1, characterized in that the shape of the hole or aperture in horizontal cross-section is an isosceles triangle.

4. The spectroscopy device according to claim 2, characterized in that the shape of the hole or aperture in horizontal cross-section is an isosceles triangle.

5. The spectroscopy device according to claim 1, wherein the shape of the hole or aperture in horizontal cross-section is an isosceles trapezoid.

6. The spectroscopy device according to claim 2, wherein the shape of the hole or aperture in horizontal cross-section is an isosceles trapezoid.

7. A spectroscopy device comprising a metal plate having a uniform thickness with an aperture running from the upper face to the bottom face, wherein:
   when a cross-section of the aperture is taken parallel to the upper and bottom faces of the metal plate and three of the sides forming the cross-section are selected in descending order of length, extended lines of the three sides form an isosceles triangle having a narrow apex angle;
   at least those of the inner side faces of the aperture contacting isosceles sides of the isosceles triangle are finished as mirror like reflection surfaces; and
   polarized input light inputted from the upper face of the metal plate to the aperture is separated into a plurality of wavelength ranges by interference caused by reflection of the input light on the reflection surfaces of the aperture.

8. The spectroscopy device according to claim 7, wherein the device further comprises a polarizing element on the upper side thereof, and the polarization direction of the polarizing element is set to a direction parallel to the perpendicular bisector of the bottom side of the isosceles triangle.

9. The spectroscopy device according to claim 7, wherein the device further comprises a polarizing element on the upper side thereof, and the polarization direction of the polarizing element is set to a direction orthogonal to the perpendicular bisector of the bottom side of the isosceles triangle.

10. The spectroscopy device according to claim 7, wherein the aperture runs perpendicular to the upper and bottom faces of the metal plate.

11. A spectroscopy apparatus comprising:
   the spectroscopy device according to claim 7; and
   a light receiving element disposed at a position on the bottom face of the spectroscopy device corresponding to a localized position of spectral distribution of the input light,
   wherein the spectral distribution is converted to an electrical signal by the light receiving element.

12. The spectroscopy apparatus according to claim 11, wherein a plurality of the light receiving elements is disposed at positions corresponding to a plurality of localized positions of the spectral distribution.

13. A two-dimensional spectroscopy apparatus comprising a plurality of the spectroscopy apparatuses according to claim 11 disposed two-dimensionally.

14. A two-dimensional spectroscopy apparatus comprising a plurality of the spectroscopy apparatuses according to claim 12 disposed two-dimensionally.

15. A spectroscopy method comprising the steps of:
   providing a metal plate having a hole or aperture formed in a polygonal shape having at least a pair of opposite faces not parallel to each other in horizontal cross-section, the hole or aperture being open on the upper side with inner side faces thereof finished as mirror like reflection surfaces; and
   inputting polarized input light from the opening to the hole or aperture and generating a standing wave inside of the hole or aperture by interference caused by reflection of the input light on the reflection surfaces, whereby separating the input light into a plurality of wavelength ranges.

* * * * *